United States Patent [19]
Anderson et al.

[11] Patent Number: 5,806,945
[45] Date of Patent: Sep. 15, 1998

[54] MODULAR ENCLOSURE AND METHOD

[75] Inventors: Thomas E. Anderson, Schaumburg; Glen A. Stelzer, Oak Forest, both of Ill.

[73] Assignee: Amco Engineering Co., Schiller Park, Ill.

[21] Appl. No.: 719,899

[22] Filed: Sep. 25, 1996

Related U.S. Application Data

[62] Division of Ser. No. 532,271, Sep. 22, 1995, Pat. No. 5,639,150.

[51] Int. Cl.$^6$ ..................................................... A47B 47/00
[52] U.S. Cl. ..................................... 312/265.3; 312/265.5; 312/265.6
[58] Field of Search ............................. 312/265.5, 265.1, 312/265.4, 265.6, 265.3, 351; 108/107

[56] References Cited

U.S. PATENT DOCUMENTS

| | | | |
|---|---|---|---|
| 3,028,211 | 4/1962 | Wells et al. | 312/265.1 |
| 3,056,507 | 10/1962 | Squires, Jr. et al. | 108/107 X |
| 3,265,419 | 8/1966 | Durnbaugh et al. | 312/265.5 X |
| 3,912,407 | 10/1975 | Heininger | 52/657 X |
| 3,914,062 | 10/1975 | Heininger | 52/657 X |
| 4,037,376 | 7/1977 | Baal-Taxa | 312/265.5 X |
| 4,050,498 | 9/1977 | Lucchetti | 52/657 X |
| 4,102,554 | 7/1978 | Reimer | 312/265.1 X |
| 4,236,774 | 12/1980 | Diaz | 312/351 |
| 4,592,672 | 6/1986 | Ruch, Jr. | 52/657 X |
| 4,900,108 | 2/1990 | Tischer | 312/265.3 |
| 5,228,762 | 7/1993 | Mascrier | 312/265.4 |
| 5,250,752 | 10/1993 | Cutright | 312/265.4 X |
| 5,326,162 | 7/1994 | Bovermann | 312/265.3 |
| 5,333,950 | 8/1994 | Zachrai | 312/265.1 |
| 5,372,262 | 12/1994 | Benson et al. | 312/265.4 X |
| 5,407,263 | 4/1995 | Jones et al. | 312/265.6 X |
| 5,536,079 | 7/1996 | Kostic | 312/265.3 |

*Primary Examiner*—James R. Brittain
*Assistant Examiner*—Stephen Vu
*Attorney, Agent, or Firm*—Jack E. Dominik

[57] ABSTRACT

The development of a main channel configuration which constitutes the four corners and vertical support of an enclosure is disclosed. The channel is essentially a right angle with the vertex of the angle chamfered which provides additional strength, and a pleasing sturdy aesthetic appearance. The lateral faces of the channel terminate in recessed gutters. The channel itself is symmetrical about a plane extending perpendicular through the chamfered face which connects the two side faces. The enclosure thereafter contemplates eight gussets, four at the top corners and four at the bottom corners. The gussets join cross ties at the two sides, and the front and rear, both top and bottom. Horizontal and vertical unistruts are provided in nestingly overlapped fashion interiorly of the main channels to add additional strength and also to secure the mounting channels which are positioned at various pre-selected locations.

11 Claims, 5 Drawing Sheets

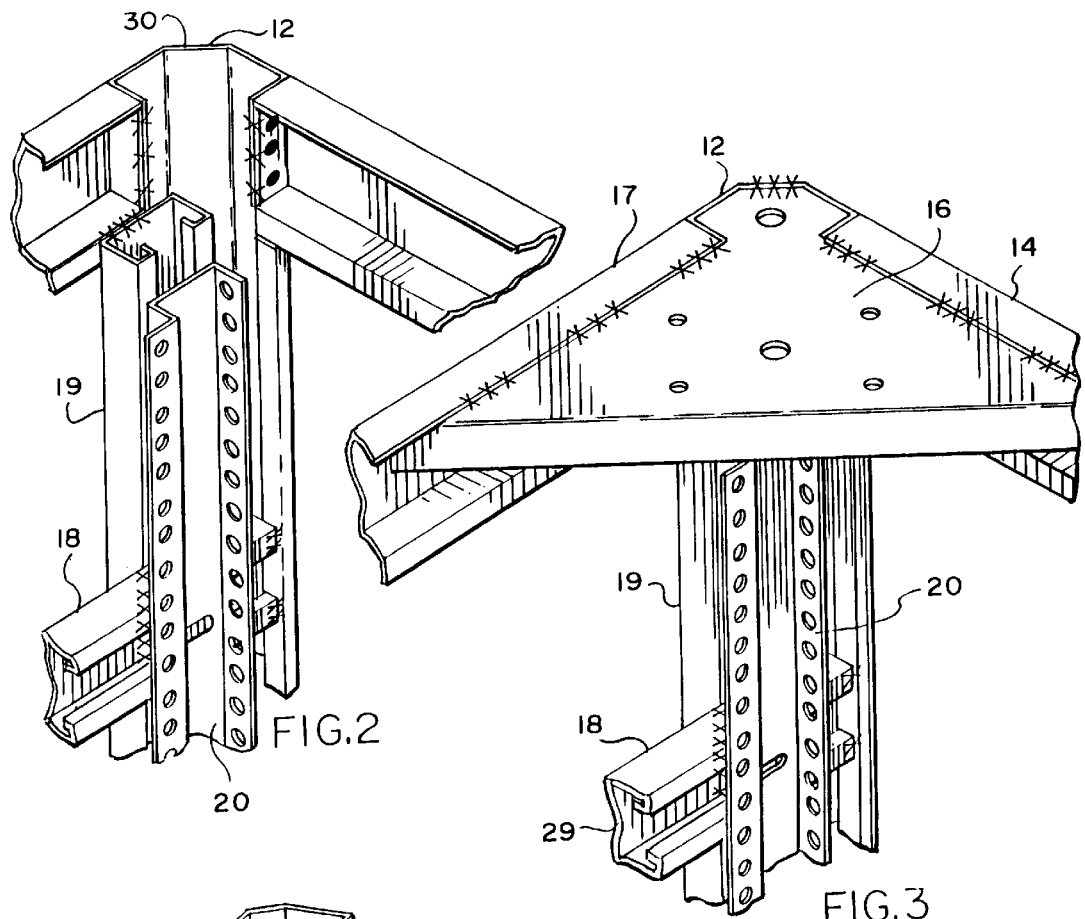
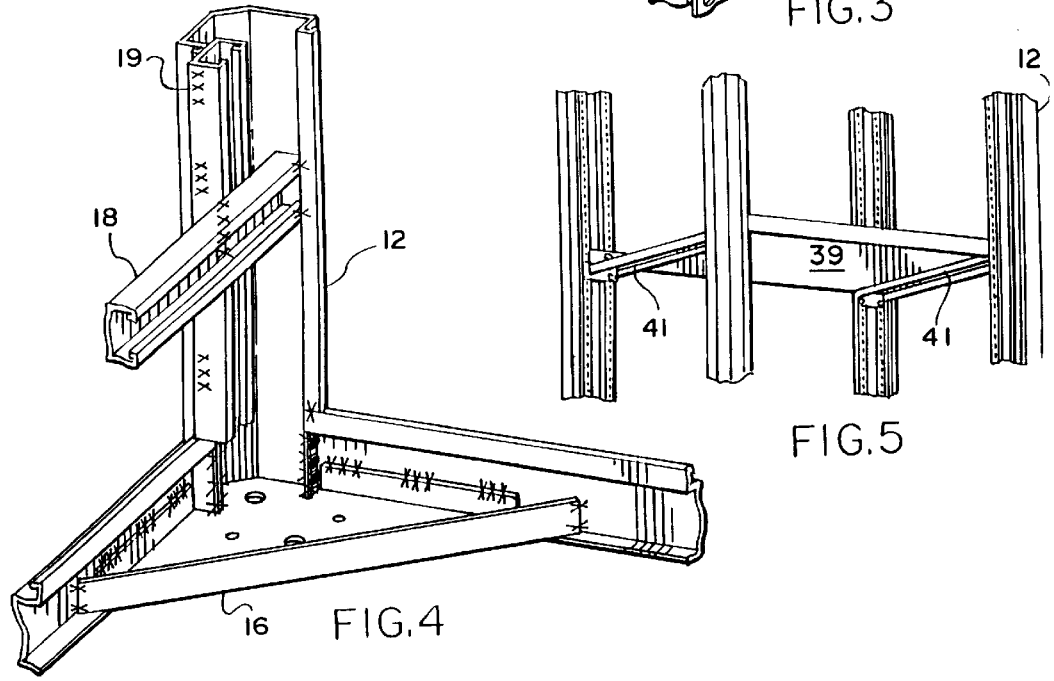

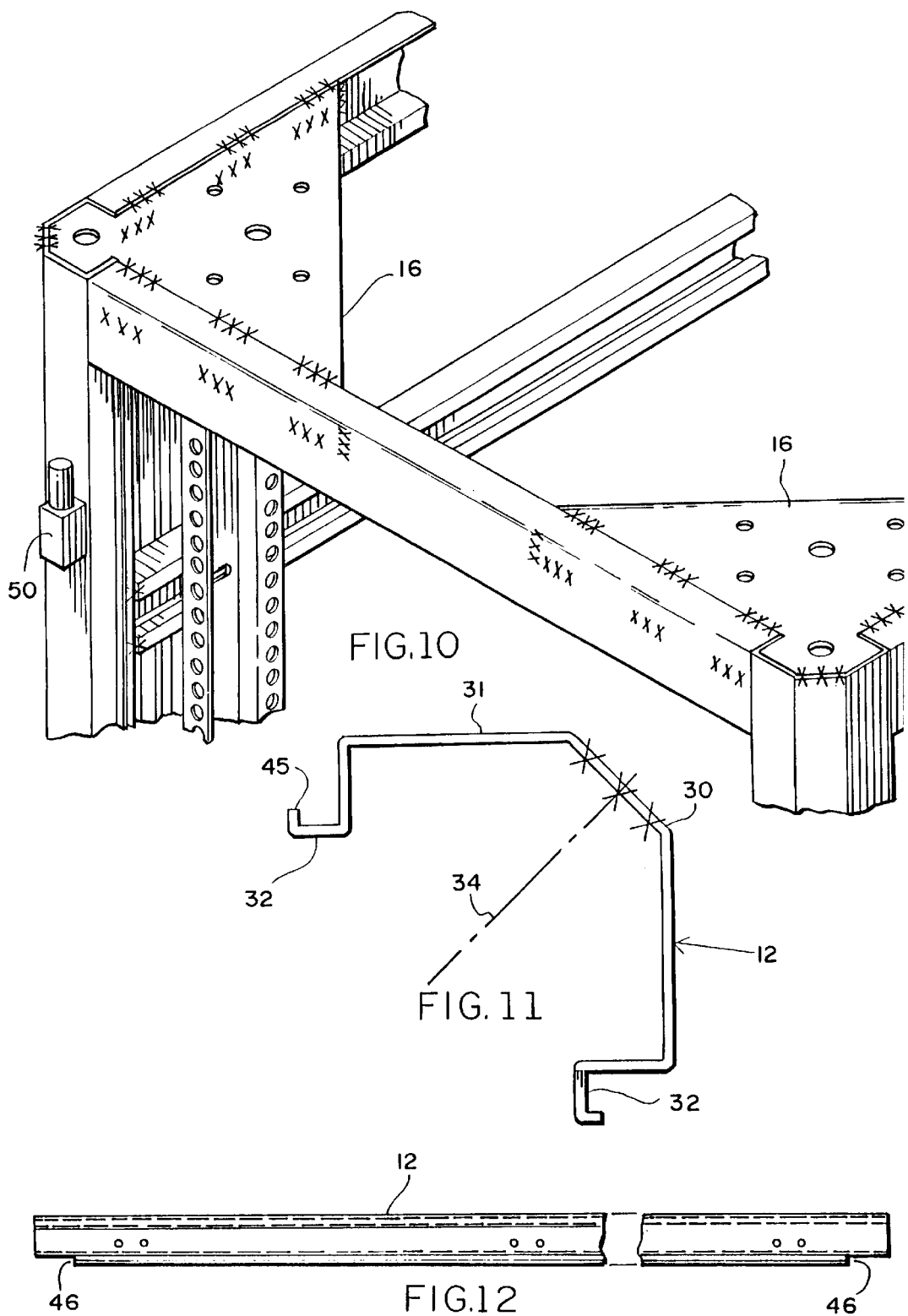

MODULAR ENCLOSURE AND METHOD

This application is a divisional of U.S. patent application No. 08/532,271, filed on Sep. 22, 1995, now U.S. Pat. No. 5,639,150.

BACKGROUND OF THE INVENTION

The present invention relates to a modular enclosure and method of the type employed to house computer hardware, communications gear, and other electronic components which conforms to various standards for size, strength, and access known in the industry.

SUMMARY OF THE PRIOR ART

The present invention is involved in the enclosing and housing of computer gear, communications gear, and other electronic equipment. Exemplary of the present invention are U.S. Pat. Nos. 2,991,940 and 3,034,844, both expired and both assigned to the assignee of this application.

Of the subject patents, particularly U.S. Pat. No. 2,991,940 when developed was the state of the art even at the time the patent application was filed. It did meet certain static strength requirements which were adequate at the time.

Since the development of U.S. Pat. Nos. 2,991,940, 3,034,844, and 3,087,768, however, a whole new industry of computers and communications gear have evolved. Some of these if subjected to earthquake tremors or indeed an earthquake, can be substantially damaged. In addition, they are sensitive to spurious electro-type emissions. The subject of RFI shielding was in its infancy at the time of the development of the products of the subject three state of the then art patents.

In addition, including the various practical needs for such an enclosure, there are currently four requirements based upon national and international standards. They are the following:

1. Bell Core NEBS, which is a seismic test.
2. FCC primary RFI test.
3. NEMA test—NEMA certification capabilities, leakage, dust and contaminant penetration, and the like.
4. IEC—these are certain international requirements which may or may not be included in the three foregoing requirements. Severe earthquakes, in addition to destruction of homes, highways, and office buildings, have resulted in the twisting and mangling of computers and related communications gear. Subsequent damage from after shocks have also been severe. Had the electronics been housed in a stronger housing, however, such damage could have been mitigated if not inhibited or eliminated in some cases. Therefore, it is highly desirable to develop a modular enclosure which, because of its modularity, renders it relatively inexpensive to manufacture. Moreover, it is highly desirable to develop such a modular enclosure which is resistant to lateral loads, torsional loads, vibratory loads, and other severe conditions which may be anticipated from an earthquake or, indeed, from nearby exploding bombs where a military installation is involved. In addition, such a modular enclosure should lend itself to RFI shielding at least for primary purposes.

SUMMARY OF THE INVENTION

The present invention evolves from the development of a main channel configuration which constitutes the four corners and vertical support of an enclosure. The channel is essentially a right angle with the vertex of the angle chamfered which provides additional strength, and a pleasing sturdy aesthetic appearance. The lateral faces of the channel terminate in recessed gutters. The channel itself is symmetrical about a plane extending perpendicular through the chamfered face which connects the two side faces. In this fashion the main channel does not know left from right, or up from down, and as a consequence one single channel can be used to develop the entire vertical skeleton of the enclosure. The enclosure thereafter contemplates eight gussets, four at the top corners and four at the bottom corners. The gussets join cross ties at the two sides, and the front and rear, both top and bottom. Horizontal and vertical unistruts are provided in nestingly overlapped fashion interiorly of the main channels to add additional strength and also to secure the mounting channels which are positioned at various pre-selected locations. The mounting means are for preselected equipment up and down along the mounting channel and its adjacent main channel. Desirably a reinforced shelf is employed as part of the mounting means. The cross ties are characterized by a comparable gutter to the gutter in all of the main channels which permits the uniform insertion of RFI and environmental insulating materials. Such material can also be employed to seal the interior from the passage of contaminants. Provision is made for butt joints of all of the cross ties with the main channels to the end that they can be seam welded to inhibit RFI leakage and otherwise seal the enclosure. Optionally, a top is provided for the enclosure which, in turn, is secured to the upper cross ties, gusset, and main channel. Side panels with flush lateral edges overlie gutters in the main channel and similarly the gutter edges in the top cross tie and bottom tie thereby adding RFI shielding and promoting a monocoque effect. Access is provided to the front and rear of the enclosure by means of removable panels, or hinged doors, or a combination of the same. Optionally, a transparent panel can be applied to the front or rear and the equipment which is inserted through slides and otherwise removably secured so that operating personnel may observe the interior portion of the enclosure whenever desired. An important aspect of one version of the present invention relates to a relatively "boltless" construction. As many joints as physically possible are seam or spot welded and the only bolts employed are to adjust the shelf upwardly and downwardly. As a result the structural integrity for purposes of seismic testing can readily be achieved. Alternatively, where the seismic testing or resistance is not required, the expense of the welding can be avoided and still have a cabinet with numerous advantages as to strength, structural integrity, and manufacturing economies.

In view of the foregoing it is a principal object of the present invention to provide an enclosure which is predicated upon a main channel which is common to all of the four corners throughout the entire vertical height of the enclosure.

A related object of the present invention is to provide a main channel and related cross ties, and gussets, to form an enclosure which, because of the gutter arrangements, is readily adaptable to RFI and environmental shielding when panels are employed which have perpendicular lateral edges with the thus-oriented gutters of the main channel and cross ties.

Yet another object of the present invention is to provide an enclosure with the main channel as described which, because of its monocoque construction as well as interior framing and the main channel will withstand significant cantilever lateral loads, which are applied from side-to-side with the back and front panel removed, the condition most vulnerable to deflection.

Yet another object of the present invention is to provide an enclosure with the basic main channel which, because of its inherent strength, monocoque construction, and integral relationship between the skeleton and the skin or frame and panels will seal the same to shield both ingress and egress undesired signals and environmental undesirables such as gases, oils, fumes, acid-laden air, and other contaminants.

Still another important object of the present invention is to achieve the foregoing objects in an environment where modular changes can be made in the depth and height of the ultimate enclosure without significant additional tooling or fixturing and predicated upon the modular aspects of the main channel, gussets, cross ties and unistruts.

Finally, a most important object of the present invention is to achieve all of the foregoing advantages in a structure which is cost-effective when due consideration is given to the numerous advantages which it achieves over the prior art.

BRIEF DESCRIPTION OF THE ILLUSTRATIVE DRAWINGS

Further objects and advantages of the present invention will become apparent as the following description of an illustrative embodiment proceeds, taken in conjunction with the accompanying drawings, in which:

FIG. 2 is a cut away view of a top corner showing the main channel, cross ties, and unistruts in their exploded relationship (hereinafter note that all subsequent Figures including this one show welds in seamless forms with a string of "x's", and where spot welding is used, a dark circle is employed. This is applicable to FIGS. 2–18);

FIG. 3 is a perspective view of a top corner showing the corner gusset;

FIG. 4 is a view comparable to that of FIG. 3 but in perspective showing the bottom corner gusset and cross ties and unistruts;

FIG. 5 is a perspective view showing a shelf mounted interiorly of frame;

FIG. 10 is yet another perspective view of the two top front gussets showing the provision for the removable hinge mounting of the front door;

FIG. 11 is a cross-sectional view of the main channel indicating its various components with a center line shown with respect to which both sides of the main channel are symmetrical;

FIG. 12 is a front elevation of the main channel predrilled for the hinge assembly shown broken for purposes of illustration;

DESCRIPTION OF A PREFERRED EMBODIMENT

Figure 1:
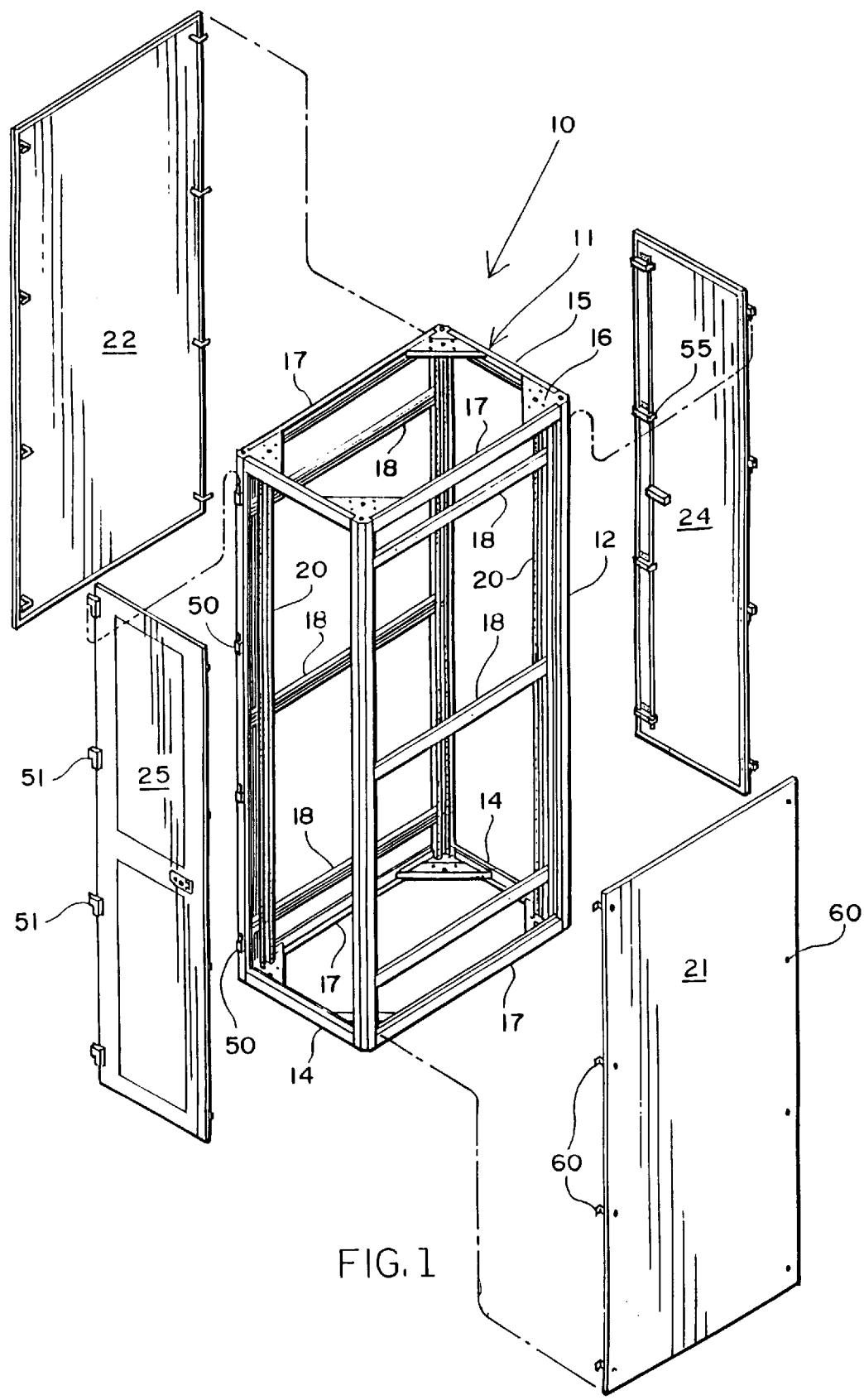
FIG. 1 is an exploded perspective view of an illustrative enclosure showing the frame in the central portion, the two side panels to the left and right, and the front and rear panels in their removed relationship to the frame.
Figure 6:
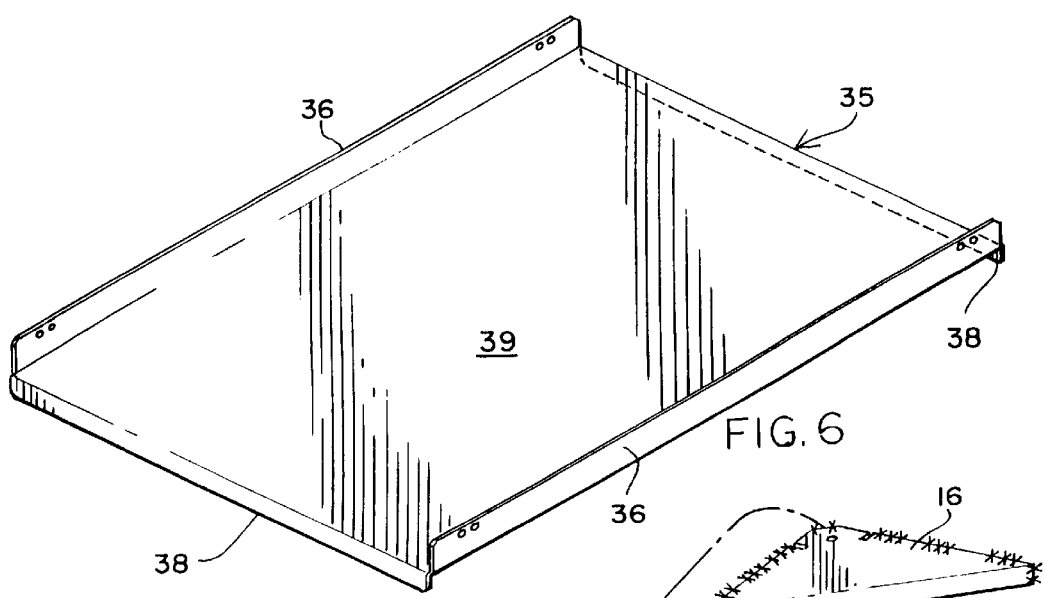
FIG. 6 is a perspective view of the shelf as shown in FIG. 5.

The preferred embodiment of the subject modular enclosure 10 is illustrated in FIG. 1. There it will be seen that the modular enclosure 10 is predicated upon a main channel 12 which forms all four of the vertical corners. The main channels 12, in turn, are secured by means of front and rear cross ties 14, 15. Gussets 16 join the cross ties 14, 15 at both the top and bottom. Unistruts 18 which are both horizontal 18 and vertical 19 are applied interiorly of the enclosure 10, and mounting channels 20 are provided to modularly and in spaced relationship on a preselected spacing receive, and support, the enclosure and enclosed materials. Desirably shelves 39 fit within the enclosure 10 and are secured horizontally to the mounting channels 20, both front and rear. The entire cabinet is housed by panels for both the lateral sides 21 and 22. Those panels, are complimented by a rear panel 24 or door, and a front panel or door 25. The main channel 12 has a chamfered face 30, lateral faces 31, terminating in reversely formed gutters 32. A symmetrical relationship is provided between the lateral faces and gutters along an imaginary plane 34 drawn perpendicular to the chamfered face of the main channel 12. All of the ties desirably have matching gutters to the gutters 32 of the main channel 12 to provide a uniform frame for the side panels 21, 22 and rear and front doors 25, 26 or panels.

Figure 7:
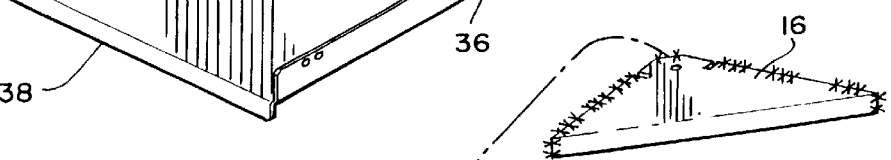
FIG. 7 is yet another exploded perspective view of a typical top corner and showing the relationship between a unistrut slide nut and the welded aspects of the joint.
Figure 8:
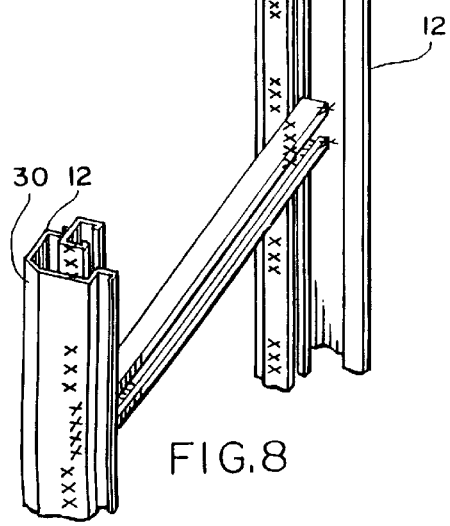
FIG. 8 is yet another perspective view of the overlapped unistrut horizontal and vertical members resting in the main channels.
Figure 9:
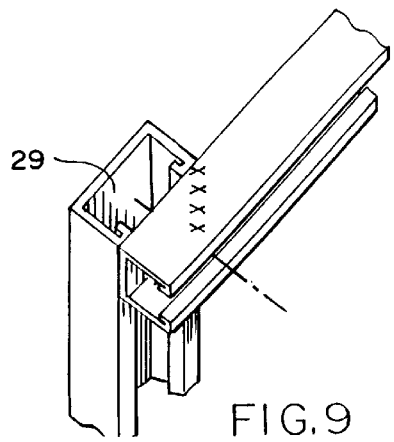
FIG. 9 is a view sequential to that of FIG. 8 but showing in specific detail how the vertical unistrut is secured to the horizontal unistrut by the captive nut.

Turning now to FIG. 2, the nesting relationship between the horizontal unistrut 18 is welded to the vertical unistrut 19 as best shown in FIG. 9 as well as FIGS. 2, 3, and 4 by the "x's" which appear. When assembled, as shown in FIG. 4, the vertical unistrut 19 is welded to the base of one of the gutters 32 of the main channel 12. Desirably it is welded at a median portion to distribute the strength contributed by the vertical unistrut 19 in combination with the main channel 12. The horizontal unistrut 18 is bolted to the vertical unistrut 19 as best shown in FIG. 9 by means of the unistrut nut 26 which slidingly fits within the unistrut channel 29 and is secured in place by the unistrut bolt 28. This relationship is common to all of the horizontal unistruts 18 and their securement to the vertical unistrut 19. Thereafter, the mounting channels 20, as shown in FIG. 3, are further secured by means of welding adjacent all of the interlocking elements. The gussets 16 are all welded to the external flange of the ties, whether they be front cross ties 14, rear cross ties 15, or side cross ties 17. This relationship is also illustrated in FIG. 7 where further weldments are shown by means of strings of "x's" for a seam joining the vertical unistrut channel 19 in secured relationship to horizontal unistrut channel 18.

To support the various components interiorly, and also to impart additional lateral strength to the enclosure 10, desirably a shelf 35 is provided. The shelf 35 has front to rear upstanding lateral flanges 36 for mounting, and depending flanges 38 for reinforcement. The flanges depend from the pan portion 39 of the shelf 35.

Figure 18:
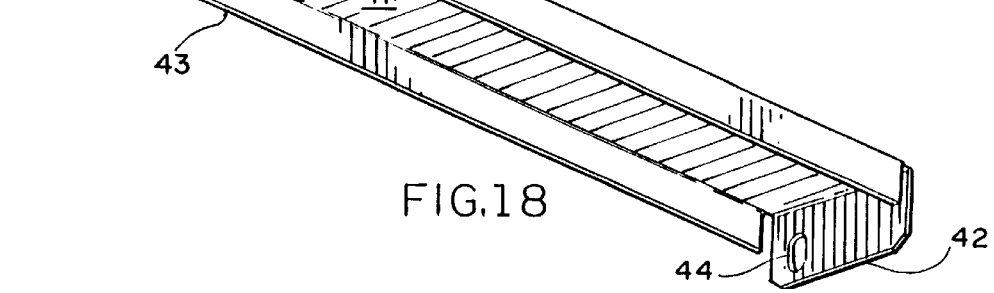
FIG. 18 is a perspective view of a reinforcing shelf bracket.

Turning now to FIG. 18, it will be seen that the shelf 35 is reinforced by means of shelf bracket 41 which includes end mounts 42 with their respective mounting slots 44. Bracket flanges 43 depend from the edges of the shelf bracket 41 to provide additional support, particularly as the front and rear portions thereof engage the reinforcing flange 38 of the shelf 35. The lateral holes in the shelf 35 as well as the longitudinal slot 44 in the reinforcing bracket 41 are utilized to secure the combination of shelf 35 and reinforcing bracket 41 to the mounting channels 20.

FIG. 12 shows the main channel 12 with its opposed gutter lip notches 46. The gutter lip notches 46, particularly as shown in FIG. 7, permits butt welding the ends of the ties into the notches so that a full weld, whether seam or spot, can secure the tie ends to the flat face of the gutter notch 46. These are mounted in flush relationship to the end that the gusset 16 as shown in FIG. 10 is beneath the lateral flanges of the ties at all eight corners, both top and bottom.

As shown in FIG. 1, hinge post 50 are provided at the front portion of the enclosure 10 to receive the hinges 51 of the front door 25. Mounting door latch brackets 55 in a single operating assembly are secured to the rear panel 24 or door 25. Finally, the side panels 21, 22 employ securement means 60 which are spaced in order to engage interior members in the enclosure rather than penetrate the gutter 32 of the main channel 12.

The preferred method of assembly of all elements is to assemble the main channels 12 to the front cross ties 15 thereby creating a pair of half frames for receiving the front or rear doors 25. Thereafter, the half frames are assembled to the opposing half frames by securing the side cross ties to the opposed main channels and nestingly receiving the gussets 16.

Figure 13:
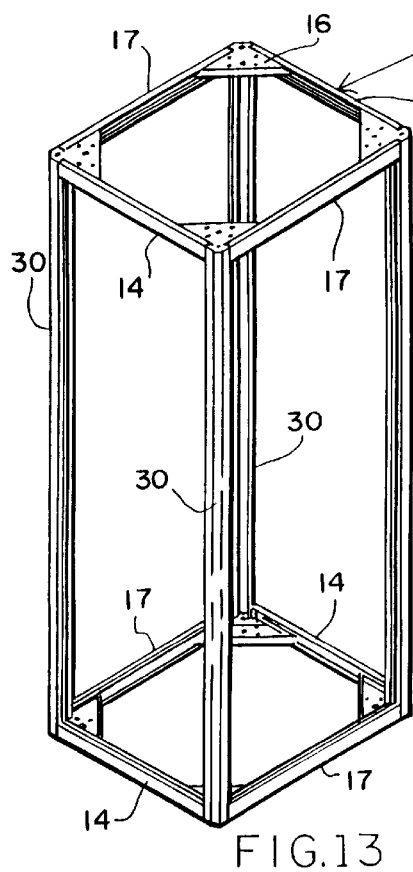
FIG. 13 is a perspective view of the basic frame illustrating its modular use of four main channels, eight corner brackets, two top cross ties, two lower cross ties, and four side cross ties.
Figure 14:
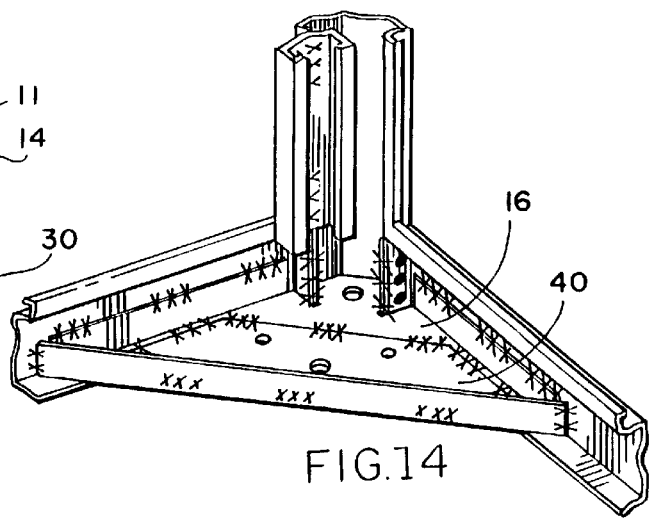
FIG. 14 is a perspective view of a typical lower corner.
Figure 15:
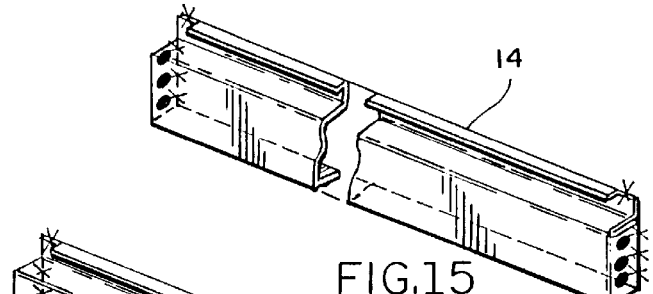
FIG. 15 is a broken perspective view of a front cross tie.
Figure 16:
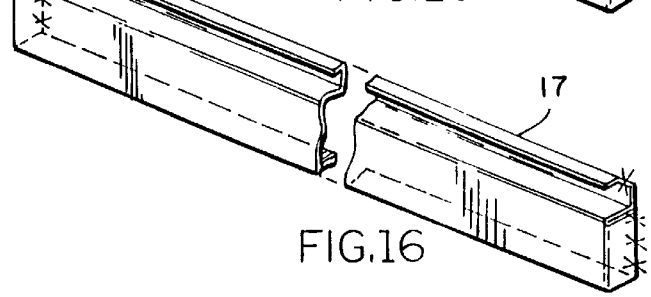
FIG. 16 is a broken perspective view of a side cross tie.
Figure 17:
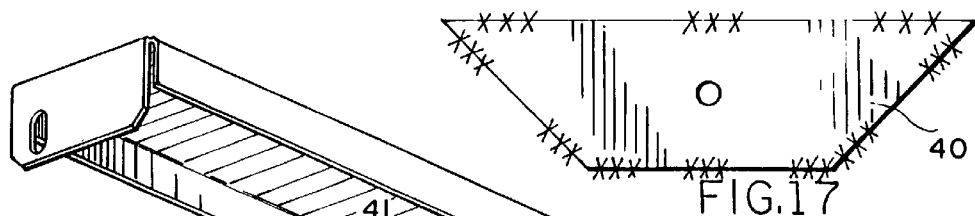
FIG. 17 is a perspective view of a bottom corner gusset bracket doubler employed for seismic reinforcement.

This basically completes the frame as illustrated in FIG. 13. Once the frame as illustrated in FIG. 13 has been completed, the vertical unistruts are desirably welded in place at a mid-portion along the base of the interior gutter of the opposed main channels 12. Thereafter, the horizontal unistruts 18 are welded in place. Finally, the frame as illustrated in FIG. 1 is completed by securing the mounting channels 20 to the horizontal unistruts 18.

At this point, the shelves 35 are installed at preselected locations, but oftentimes this is not done by the manufacturer of the enclosure but rather by the customer prior to completing the entire assembly including its electronic components. The manufacturer/customer will also then apply the side panels 21, 22 by means of their fasteners 60 to the sides of the enclosure 10, concluding the structure by applying the rear panel 24 and the front door 25 in place.

In summary it will be seen that a new cabinet is disclosed with modular elements significantly reducing inventory and manufacturing costs. Moreover, in the "boltless" construction, where welding is employed to the maximum at all places which can be reached for external welding, a cabinet with superior seismic properties results. While there is an additional cost factor in the welding where it is essential to pass Belcore seismic tests and the like, the same can be achieved. In a computer or other data processing equipment enclosure where the sensitive electronic elements are very costly, the modest increase in cost attributable to the welding is more than offset by the structural integrity which it affords.

It will be understood that various changes in the details, materials and arrangements of parts which have been herein described and illustrated in order to explain the nature of the invention, may be made by those skilled in the art within the principle and scope of the invention as expressed in the appended claims.

What is claimed is:

1. A modular enclosure comprising, in combination, a main channel corner member which is formed to have two faces, the faces being joined by a chamfer, the faces being essentially perpendicular each to the other, enclosure panels for the front, rear, and sides of said enclosure, said main channel being further characterized by reversely folded lateral edges which form lateral gutters having a lip intended to receive the closure panels, said panels being joined by top cross ties and bottom cross ties each of which has a reversely folded lateral edge complimentary to that of the main channel, each of said cross ties having a butt face for engaging the lateral edges of the main channel, gussets for filling and securing eight corners of the panel at both top and bottom which are formed with flanges for matingly engaging the respective cross ties, both top and bottom, and unistrut members, two of which are positioned vertically and interiorly of the main channel, and at least two of which are positioned horizontally and nestingly to the vertical unistrut channels, the depth of said unistrut channels being proportioned to fit nestingly and flush interiorly of the main channel when the overlapping joints are formed between the horizontal unistrut channels and their supporting vertical interior unistrut channel.

2. An electronic component enclosure comprising, in combination, four vertical main channels all of identical cross-section, each main channel having two faces disposed perpendicular to each other with gutters at the remote edges of each face, said main channel being symmetrical about a plane bisecting the convergence of the two channel faces, eight corner gussets all being identical in configuration, four side-to-side top and bottom cross ties of identical configuration, four front to rear top and bottom cross ties of identical cross-section, two identical side panels, a plurality of identical unistrut members, four of which are positioned vertically and interiorly of the main channel, and at least two of which are secured horizontally to the interiorly spaced vertically unistrut to serve as supports for a frame, the entire assembly comprising the four main channels in four corners of the enclosure secured to four gussets at the bottom and four gussets at the top, said front to rear cross ties at the top and bottom spacing the front main channels from the rear main channels, said side-to-side upper and lower cross ties spacing the lateral sides, said gussets reinforcing the eight corners of the enclosure, and said side panels nestingly secured to the main channel, and means defining weldments which secure each of the elements of the main channel corner member, top cross ties and bottom cross ties, and gussets to each other.

3. An electronic component enclosure comprising, in combination, four imperforate vertical main channels all of identical cross-section, each imperforate main channel having two imperforate faces disposed perpendicular to each other with imperforate gutters at the remote edges of each face, said main channel being symmetrical about a plane bisecting the convergence of the two channel faces, eight corner gussets all being identical in configuration, four side-to-side top and bottom imperforate cross ties of identical configuration, four front to rear top and bottom imperforate cross ties of identical cross-section, two identical imperforate side panels, the entire assembly comprising the four main channels in four corners of the enclosure secured to four gussets at the bottom and four gussets at the top, said front to rear cross ties at the top and bottom spacing the front main channels from the rear main channels, said side-to-side upper and lower cross ties spacing the lateral sides, said gussets reinforcing the eight corners of the enclosure, and said side panels nestingly secured to the main channel, and means defining weldments which secure each of the elements of the main channel corner member, top cross ties and bottom cross ties, and gussets to each other in imperforate enclosure thereby inhibiting the passage of unwanted electronic signals either from the outside of the enclosure to the inside or from the inside of the enclosure to the outside.

4. An electronic component enclosure comprising, in combination, a main channel corner member which is formed to have two imperforate faces each joined to the other, the faces being essentially perpendicular each to the other, imperforate enclosure panels for the front, rear, and sides of said enclosure, said main channel being further characterized by reversely folded imperforate lateral edges which provide reversely formed lateral gutters proportioned to receive the closure panels with space provided for an RFI material to be inserted therebetween, said panels being joined by top crossties and bottom crossties each of which has a reversely folded lateral edge gutter, and each of said crossties being imperforate and having RFI sealing means at the ends for engaging the lateral edges of the main channel, and means for securing the enclosure panels interiorly of the enclosure secured to the interior portion of the enclosure to thereby avoid openings in the imperforate enclosure panels which, in combination with the imperforate main channels and imperforate crossties, essentially RFI shield the entire enclosure.

5. In the enclosure of claim 4 above, said pan having imperforate fastening means secured to its under portion adjacent the four corners thereof, and means for passing through the enclosure into said fastening means for firmly and removably securing the top closure to the upper portion of the modular enclosure.

6. In the enclosure of claim 5 above,

RFI shielding material wrapped throughout the entire parameter of the closure member seated in the downwardly depending gutters and proportioned to extend sufficiently beyond the gutters to engage the top frame members in RFI inhibiting relationship.

7. In the enclosure of claim 5, in combination, a top closure member for said enclosure, said top closure member comprising a central essentially rectangular pan portion, flanges depending skirtwise surrounding said pan portion downwardly, and reversely bent gutters in said flanges all extending downwardly to engage the upper flanges of the front-to-rear cross ties, and the side-to-side cross ties.

8. In the enclosure of claim 5, in combination, a top closure member for said enclosure, said top closure member comprising a central essentially rectangular pan portion, flanges depending skirtwise surrounding said pan portion downwardly, and reversely bent imperforate channel-like gutters in said flanges all extending downwardly to engage the upper flanges of the front-to-rear cross ties, and the side-to-side cross ties.

9. The electronic component enclosure of claim 7, in which, said main channel corner members having a chamfer at the interface between the two imperforate faces, said chamfer being imperforate.

10. The electronic component enclosure of claim 9, in which, said main channel corner members having a chamfer at the interface between the two imperforate faces, said chamfer being imperforate.

11. The electronic component enclosure of claim 9, in which, said cross ties have butt faces at the ends for engaging the lateral edges of the main channels.

* * * * *

UNITED STATES PATENT AND TRADEMARK OFFICE
CERTIFICATE OF CORRECTION

PATENT NO. : 5,806,945
DATED : September 15, 1998
INVENTOR(S) : Thomas E. Anderson It is certified that error appears in the above-identified patent and that said Letters Patent is hereby corrected as shown below:

Title page, item [75] inventors: should read as followings:
Thomas E. Anderson, Schaumburg , Glen A. Stelzer,
Jerry L. Young, Oak Forest , all of Ill.

Signed and Sealed this

Twenty-third Day of February, 1999

Attest:

Q. TODD DICKINSON

Attesting Officer      Acting Commissioner of Patents and Trademarks